Nov. 5, 1940.  G. M. BROWN  2,220,061
EFFECTIVE TEMPERATURE CONTROL
Filed Dec. 8, 1937
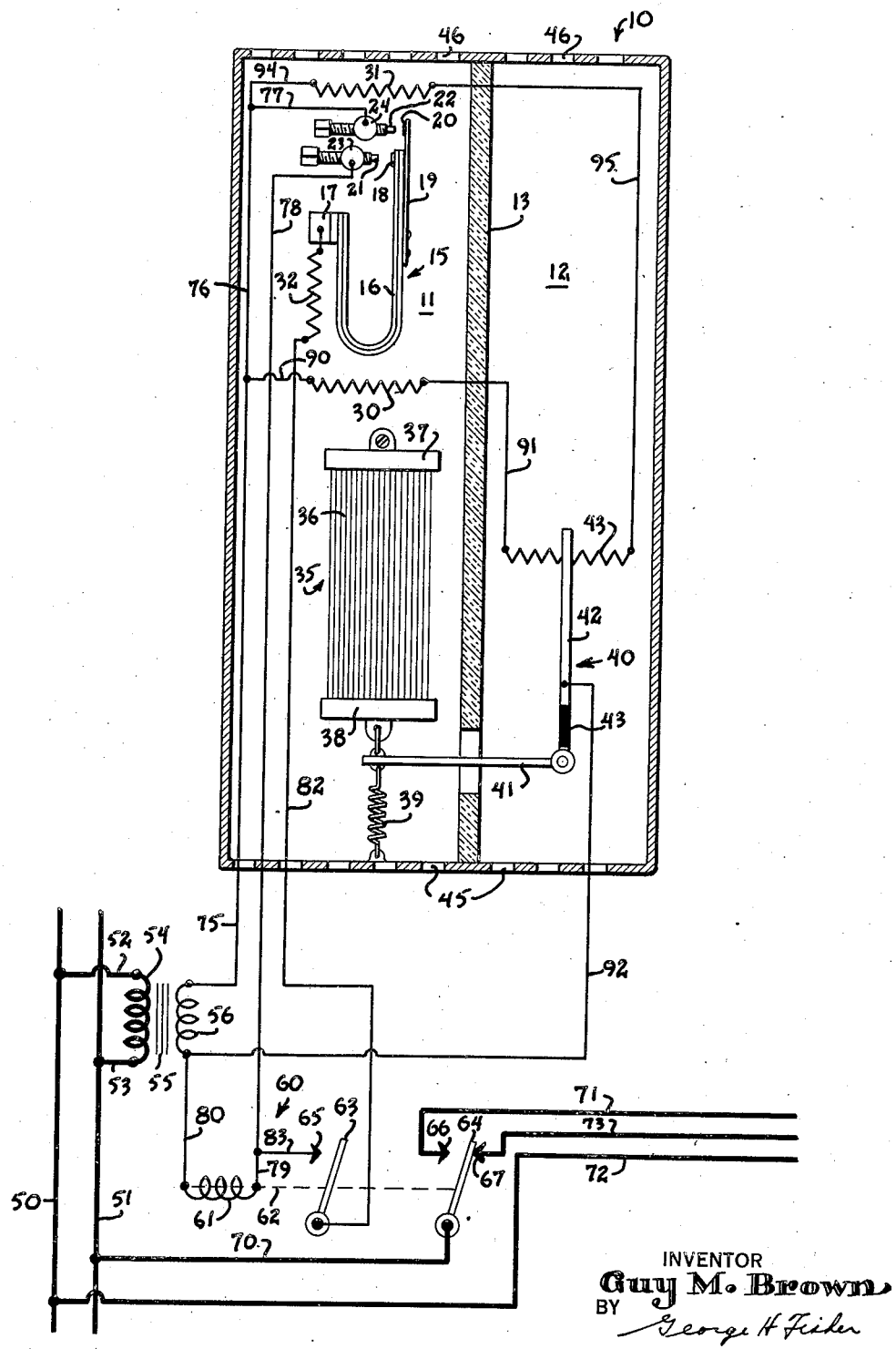

Patented Nov. 5, 1940

2,220,061

UNITED STATES PATENT OFFICE 2,220,061

EFFECTIVE TEMPERATURE CONTROL

Guy M. Brown, Minneapolis, Minn., assignor to Minneapolis-Honeywell Regulator Company, Minneapolis, Minn., a corporation of Minnesota Application December 8, 1937, Serial No. 178,732

6 Claims. (Cl. 236—44)

This invention relates to an effective temperature controller of the type wherein a temperature changing device, which may be either a heater or a cooler, is under the control of a space thermostat, and wherein means responsive to the humidity of the space being controlled vary the control point of the thermostat so that a substantially constant effective temperature is at all times maintained in the space being controlled. It is well known that the degree of comfort of a space depends both upon the temperature and the humidity existing therein, and for a high humidity, the temperature should be maintained at a lower value than is necessary when the humidity is low.

Many different ways have been proposed to vary the control point of the thermostat in accordance with changes in humidity, and one effective way is to provide a heater located in heat transfer relationship with the thermostat, the heating effect of the heater varying in accordance with the humidity of the space. By placing this heater below the thermostat, air will be caused to flow upwardly over the thermostat so that the thermostat will respond more quickly to changes in the space temperature as well as to changes in the temperature of the heater. It is of importance that the flow of air past the thermostat remain uniform regardless of the heating effect of the heater, since if the air were permitted to flow at different rates, the thermostat would not accurately respond to the combined effects of the space temperature and the heater temperature, and I have therefore provided means to compensate for varying temperatures of the heater whereby the flow of air over the thermostat remains substantially uniform at all times. This compensating means may be in the form of an additional heater located above the thermostat at a point where it has no heating effect on the thermostat but does cooperate with the first heater in creating the flow of air. The amount of air flow depends upon the combined heating effects of the two heaters, which is maintained constant by increasing or decreasing the temperature of the upper heater as the temperature of the lower heater decreases or increases, respectively.

The controller for the lower heater may be in the form of a humidity responsive element, which may be located below the thermostat in the path of the air flow, so that there is a steady flow of air over the humidity responsive element, but the element is not subjected to the heating effect of the lower heater, whereby this element quickly responds to changes in the humidity in the space being controlled.

It is therefore an object of my invention to provide an improved controller whereby a space may be maintained at a substantially constant effective temperature.

More specifically, it is an object of my invention to provide a thermostat whose control point varies in accordance with the humidity of a space being controlled, and whereby a uniform flow of air is maintained over said thermostat at all times.

Other objects will become apparent upon a study of the specification and claims in conjunction with the accompanying drawing, wherein is illustrated a preferred form of my invention.

Referring more specifically to the drawing, the control means are enclosed by a housing 10, this housing including compartments 11 and 12 separated by a wall 13 which may be of heat insulating material. A thermostat generally designated by the reference character 15 is located in the upper part of the compartment 11. This thermostat may comprise a bimetallic element 16 fixed at one end thereof by means of a bracket 17 to a wall of the housing 10, the other end of the bimetallic element 16 carrying a contact 18 and a resilient arm 19 which in turn carries a second contact 20. Fixed contacts 21 and 22 adjustably mounted in posts 23 and 24 cooperate with the contacts 19 and 20, respectively. The contacts are so arranged that contact 20 engages contact 22 before contact 18 engages contact 21 upon a drop in temperature affecting the thermostat, and upon a rise in temperature contact 18 will disengage contact 21 before contact 20 disengages contact 22. Heating elements 30 and 31 are located below and above the thermostat 13, respectively. Heater 30 will cause a rise in temperature in the thermostat 15 but the temperature of the thermostat is unaffected by the heater 31. A third heater 32 is also located in heating relationship with the bimetallic element 16 and is arranged to be heated when the temperature of the air affecting the thermostat is rising and after the contact 18 has moved away from contact 21 thus causing the disengagement of contacts 21 and 22 more rapidly than would occur in the absence of this heater. The function of these heaters will be more fully set forth later.

Also mounted in the compartment 11 is a humidity responsive element 35. This element may be composed of hygroscopic hairs 36 or any other hygroscopic element, these hairs being connected at their upper ends to a bracket 37 suitably connected to a wall of housing 10, the lower ends of the hairs being connected to a member 38 which in turn is connected by means of a tension spring 39 to the lower wall of the housing 10. Spring 39 acts to move member 38 downwardly upon a rise in humidity in the air, which rise in humidity causes the hairs 36 to be elongated. Upon a drop in humidity, the hairs 36 contract causing member 38 to move upwardly against the bias of spring 39.

Pivotally mounted in the compartment 12 is a bell crank lever 40, this lever including an arm 41 extending through a slot in wall 13 and suitably connected to member 38 of the humidity responsive element 35. A second arm 42 of the bell crank lever is arranged to move across a potentiometer resistance 43 upon a movement of arm 41 caused by elongation or contraction of hairs 36 of the humidity responsive element 35. An insulated piece 43 may be provided in the arm 42 whereby the upper portion of this arm is insulated from the rest of the bell crank lever. The heat generated by the potentiometer resistance 43 is prevented from affecting the elements in compartment 11 by reason of the insulated wall 13. Potentiometer resistance 43 is for the purpose of varying the heating effects of heaters 31 and 32 in accordance with the relative humidity in the space being controlled as will be more fully set forth in the description of the operation. Apertures 45 and 46 are provided in the lower and upper walls of the housing 10 for the purpose of permitting an upward flow of air through both compartments of the housing and over the elements housed therein.

Lines 50 and 51 are provided for conveying current from a suitable source of power (not shown) to the various parts of my system. Connected by means of conductors 52 and 53 is a primary 54 of a step-down transformer, this transformer also including a core 55 and a secondary 56. A relay generally designated by the reference character 60 is provided and includes a relay coil 61, an armature 62, switch arms 63 and 64, and contacts 65, 66, and 67. Switch arms 63 and 64 are arranged to engage contacts 65 and 66 upon energization of the coil 61, and upon deenergization of the coil 61, the arms move out of engagement with contacts 65 and 66 and arm 64 moves into engagement with contact 67. The low tension secondary 56 of the transformer supplies power for the relay coil 61 and also for the heaters 30, 31, and 32.

Suitable heating and cooling apparatus may be connected to the lines 50 and 51 and are controlled by the switch arm 64 of relay 60. The heating apparatus may be connected to the lines 50 and 51 when the switch arm 64 is in engagement with contact 66 through the following circuit: from the line 51 through conductor 70, switch arm 64, contact 66, conductor 71 to the apparatus and back through conductor 72 to the line 50. When the arm 64 is in engagement with contact 67 for cooling apparatus may be connected to the lines through conductor 70 from line 51, switch arm 64, contact 67, conductor 73 through the cooling apparatus and back through conductor 72 to the line 50. Since the heating and cooling apparatus form no part of my invention they have not been illustrated. It should be understood that during the heating season the cooling system may be rendered inoperative by operation of a manual switch so that engagement of switch arm 64 with contact 67 will not cause operation of the cooling system and likewise during the cooling season, the heating system may be rendered inoperative by any suitable switch means.

*Operation*

In the operation of the system the relay 60 is under the control of the thermostat 15. When the temperature in the air passing over the thermostat 15 drops to a sufficiently low value, contacts 18 and 20 will engage contacts 21 and 22, respectively, and cause the energization of relay coil 61 by means of the following circuit: from the transformer secondary 56 through conductors 75, 76, 77, fixed contact 22, contact 20, arm 19, bimetallic element 16, contacts 18 and 21, conductors 78, 79 through the relay coil 61 and conductor 80 to the other side of secondary 56. Energization of coil 61 causes arms 63 and 64 to move into engagement with contacts 65 and 66, respectively. Engagement of arm 64 with contact 66 will cause the operation of the heating means, it being assumed for the present that the system is operating during the heating season. Engagement of arm 63 with contact 65 creates a holding circuit for the relay coil 61, which circuit is independent of contacts 18 and 21 so that coil 61 will remain energized until contact 20 is moved away from contact 22, this holding circuit being as follows: from the secondary 56 through conductors 75, 76, 77, contacts 22 and 20, arm 19, bimetallic element 16, bracket 17, heater 32, conductor 82, arm 63, contact 65, conductors 83 and 79, coil 61 and conductor 80 to the other side of the secondary 56. It will be noted that this holding circuit for the relay 60 includes the heater 32 so that upon the disengagement of contacts 18 and 21, which occurs after the temperature has risen to a predetermined degree, heater 32 begins to heat up so that the thermostat becomes heated thereby faster than it is heated by the air passing thereover and contact 20 moves away from contact 22 sooner than it would were the heater not present. By accelerating the opening of contacts 20 and 22 and the deenergization of the relay 60 the heating system is stopped sooner than it otherwise would be and the inherent lag of the heating system is thereby compensated for. In other words, the danger of the temperature over-running by reason of the lag in the heating system is considerably reduced by reason of the heater 32.

Heater element 30 is at all times energized by the following circuit: from the transformer secondary 56 through conductors 75, 90, heater 30, conductor 91 through the portion of the potentiometer resistance 43 to the left of arm 42, through arm 42 and conductor 92 to the other side of secondary 56. The heater 31 is also continuously energized by the following circuit: from transformer secondary 56 through conductors 75, 76, 94, heater 31, conductor 95 through the portion of potentiometer resistance 43 to the right of arm 42, through arm 42 and conductor 92 to the other side of secondary 56. It will be apparent that the amount of current through heaters 30 and 31 depends upon the position of arm 42 with respect to resistance 43. Thus, if the arm 42 moves toward the left the amount of resistance in series with heater 30 is reduced and the amount of resistance in series with heater 31 is increased, whereby the heating effect of heater 30 increases and the heating effect of heater 31 decreases. Upon movement of arm 42 to the right, the opposite effect results. Heaters 30 and 31 are preferably of substantially the same capacity so that the combined heating effect of the two heaters will remain substantially constant regardless of the position of arm 42 with respect to resistance 43.

Resistance 30 being located below the thermostat 15 causes the thermostat to respond to a temperature which is higher than the temperature in the space being controlled and the difference in the temperature of the air affecting the thermostat and the temperature of the air in the space is controlled by the heating effect of heater 30. Movement of arm 42 is controlled by the humidity responsive element 35 and accordingly the heating effect of heater 30 is under the direct control of the humidity responsive element 35, or in other words, the humidity of the space being heated. Upon an increase in the humidity of the space for example, member 38 moves downwardly, thus permitting downward movement of arm 41 under the bias of spring 39 which causes movement of arm 42 to the left over resistance 43. This in turn causes an increase in heating effect of heater 30 so that the thermostat is heated to a higher value by this heater with the result that a lower temperature is maintained by the thermostat in the space being heated. On the other hand as the humidity in the space decreases, arm 42 is caused to move to the right over resistance 43 thus decreasing the effect of heater 30 so that a higher space temperature is required to satisfy the thermostat 15. It will thus be seen that by properly proportioning the various parts the effective temperature in the space may be maintained at a substantially constant value.

Air is caused to circulate upwardly through openings 45 over the humidity responsive element 35 and the thermostat 15 by means of heaters 30 and 31. By maintaining a steady flow of air from the space over these elements it will be obvious these elements will more quickly respond to changes in the humidity or the temperature in the space being controlled. It is of importance however that this flow of air be maintained uniform for varying conditions as a varying flow of air would vary the responsiveness of the thermostat 15. By reason of the heater 31 cooperating with the heater 30, as previously described, this flow of air may be maintained at a substantially uniform value regardless of the heating effect of heater 30 on the thermostat 15. By locating the humidity responsive element 35 below heater 30, the temperature of the air as it passes over this element will be the same as the temperature of the space and consequently this element will correctly respond to varying changes in the relative humidity in the space. The provision of the wall 13 of insulating material separating the resistance 43 and the elements in compartment 11 insures that the temperature of this resistance will have no effect upon the elements in the compartment 11.

During the cooling season the operation will be substantially the same as that above described except that the cooling system will be placed in operation whenever arm 64 engages the contact 67 which occurs whenever the relay is deenergized. When the effective temperature in the space drops to a low enough value and contacts 18 and 20 engage contacts 21 and 22, respectively, of the thermostat 15, the relay 61 will be energized and arm 64 will move away from contact 67, thus interrupting the operation of the cooling system. The effect of heater 30 will be the same as during the heating cycle, cooperating with the thermostat 15 to vary the temperature in the space according to changes in the humidity existing therein. The operation of the system during the cooling season should be readily understood by those skilled in the art upon a study of the description of the operation of the system during the heating cycle, and a further description is believed unnecessary.

It will thus be seen that I have provided a controller by means of which the temperature of a space may be maintained at a constant effective value during either the cooling or the heating seasons, the controller being compact and one which will very quickly respond to changes in the temperature or humidity of the space being controlled.

Having described a preferred form of my invention, many modifications may become apparent to those skilled in the art and it should be understood that the invention is to be limited only by the scope of the appended claims.

I claim as my invention:

1. An effective temperature controller comprising a temperature responsive element, a heater located below said temperature responsive element for raising the temperature of said element above the temperature of a space being controlled, a second heater located above said temperature responsive element, and cooperating with said first heater to cause a flow of air over said heater and said temperature responsive element, condition responsive means for controlling the heating effect of the first heater and for simultaneously controlling the heating effect of the second heater whereby the combined heating effect of the two heaters remains constant at all times, thereby insuring that the flow of air over said thermostat will remain constant regardless of the heating effect of the first heater.

2. An effective temperature controller comprising a temperature responsive element, casing means surrounding said element and providing for a flow of air vertically upward over said element, heating means below said element in the path of air flow, heating means above said element in the path of air flow, and means for increasing or decreasing the heating effect of said first heating means as the relative humidity in the space whose temperature is being controlled increases or decreases and simultaneously decreasing or increasing the heating effect of the second heating means whereby the two heating means cooperate to cause a uniform flow of air over the first heating means and the temperature responsive element regardless of the heating effect of said first heating means.

3. An effective temperature controller comprising a temperature responsive device, a housing surrounding said temperature responsive device having air inlet and outlet openings at the bottom and top respectively, a heater located in heat transfer relationship below said temperature responsive device, means for varying the heating effect of said heater in response to changes in humidity in a space whose temperature is being controlled, and means cooperating with said heater to at all times maintain a uniform flow of air over said temperature responsive device regardless of the heating effect of said heater.

4. An effective temperature controller comprising a temperature responsive device, a humidity responsive device, a housing surrounding said devices with the temperature responsive device in the upper portion thereof and the humidity responsive device in the lower portion thereof, said housing having air inlet and outlet openings in the bottom and top respectively, a heater located in heat transfer relationship with said temperature responsive device near the lower portion thereof and above said humidity responsive device, means under the control of said humidity responsive device for controlling the heating effect of said heater, and means cooperating with said heater to at all times maintain a uniform flow of air over said devices regardless of the heating effect of said heater.

5. An effective temperature controller comprising a temperature responsive device, a humidity responsive device, a housing surrounding said devices with the temperature responsive device in the upper portion thereof and the humidity responsive device in the lower portion thereof, said housing having air inlet and outlet openings in the bottom and top respectively, a heater located in heat transfer relationship with said temperature responsive device near the lower portion thereof and above said humidity responsive device, means under the control of said humidity responsive device for controlling the heating effect of said heater, a heater located above said temperature responsive device, and means for at all times maintaining the combined heating effect of the two heaters constant, whereby a constant flow of air is created by the heaters over the first heater and the temperature responsive device regardless of the heating effect of the first heater.

6. An effective temperature controller comprising in combination, a temperature responsive element, heating means in heat exchange relationship with said element, humidity responsive means varying the amount of heat given off by said heating means in accordance with variations in humidity, said heating means inducing a flow of air past said element which varies in accordance with the amount of heat given off by said heating means, and means acting in conjunction with said heating means to maintain a constant flow of air past said element regardless of the amount of heat given off by said heating means.

GUY M. BROWN.